Jan. 27, 1959    W. W. MORRIS    2,871,329
ELECTRICAL RESISTANCE WIRE NETS AND TERMINALS
Filed Aug. 3, 1954    2 Sheets-Sheet 1

INVENTOR.
WILLIAM WARDER MORRIS
BY William Warder Morris

*INVENTOR.*
WILLIAM WARDER MORRIS

United States Patent Office 2,871,329
Patented Jan. 27, 1959

2,871,329

ELECTRICAL RESISTANCE WIRE NETS AND TERMINALS

William Warder Morris, Haddam, Conn., assignor of one-half to Carlos B. Ellis, Middletown, Conn., and one-half to Jean K. Morris, Haddam, Conn.

Application August 3, 1954, Serial No. 447,580

9 Claims. (Cl. 201—63)

My invention relates to electrical resistor nets formed of wire and other heater structures, and relates more particularly to means for connecting the power supply to said nets or structures.

Those skilled in the art know that the ranges of wire sizes used in nets range from approximately 20 to 40 B. & S. gauge in solid wire and from #16 to #36 approximately in stranded wires, said sizes being suitable for configurations of wire such as are found in these nets.

Since the dissipation of heat either for heating purposes, or for the purpose of effecting rapid cooling to stabilize resistance factors, is often the purpose of such nets, the amperage through said wires is of prime concern and in the vast majority of cases, current is supplied to heat the net, and heat is not desired in the lead. It is also true that such nets may incorporate one or more circuits connected in parallel to the same power source, thereby increasing current through the lead. Also, the temperatures at which the net may be operating are often such that a lead by conduction and/or radiation, may become heated to an undesirable temperature. It is also known to the art that mechanical strength in the lead is frequently required to resist vibration, flexing and tensile strain. In the past such considerations have been alleviated by several methods, such as (1) doubling the hot lead back into the net and twisting it onto itself; (2) incorporating an insulated cold lead integral with the structure, thereby permitting the supporting members to hold such lead in position and making connection thereto inside the net; (3) extending the circuit-bearing members of the structure from the net in the form of a loop and effecting a cold lead junction externally, thereafter either dividing the circuit in the net or cutting the circuit-bearing member on one side of the connection so that the extension merely effects mechanical strain relief. Such methods are effective only for limited temperature ranges and, especially in a structure including an integral cold lead inside the net, there may be a change, sometimes undesirable, in dimensional thickness of the net, thereby causing an unwanted interference with compressive contact or creating a difficult connection problem between a fine resistance wire and a cold lead of greater dimensional thickness. Also the problem of keeping insulating materials "in situ" at junctions in order to allow current to be supplied to nets running at temperatures in excess of 550° F., with safety and convenience, has proven troublesome and has limited the use of such nets.

My invention overcomes these limitations and problems in a new and novel manner, as will be noted by this disclosure, and both mechanically and thermally affords relief from the limitations heretofore present in electrically connecting resistance nets or other heater structures.

Figure 1:
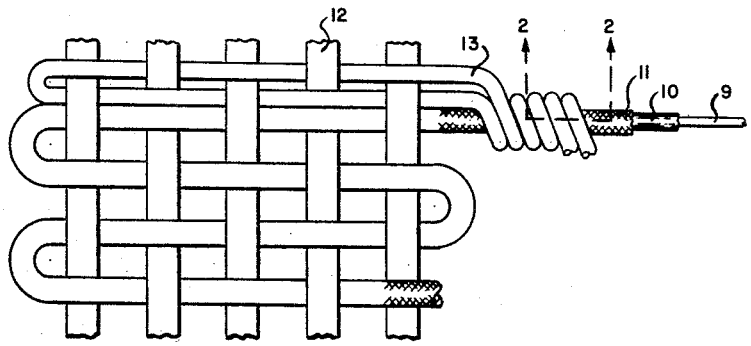
Fig. 1 is a fragmentary plan view of a heater element embodying the invention.

One method of effecting a solution to these problems in heater elements where the operating temperatures are below the critical temperatures of glass fibre insulation is as follows and shown in Fig. 1: In a woven net including heater wire 9 and a body of metallic supporting members 12 having the form of flat strips of substantial surface area there is provided an elongate terminal-supporting and strengthening member 13 which may take the form of a noncurrent-bearing length of glass fibre insulated wire of relatively equal dimensional thickness to the net's circuit-conducting wire 9 and preferably of electrically lower resistance and of greater thermal conductivity, which is looped around one of the metallic strips 12 and extended in parallel relation to the lead of the heater wire 9 which is allowed to extend beyond the area of the net proper. The last-mentioned loop formed in the wire 13 is woven through the metallic strips 12 and wrapped around the terminal portion of the heater wire 9 to support and strengthen the latter. The looped wire 13 increases thermal dissipation in the lead without appreciably affecting dimensional thickness of the net. The wire 13 provides a supporting member which aids in the dissipation of heat from the lead or terminal portion of the heater wire 9.

Figure 5:
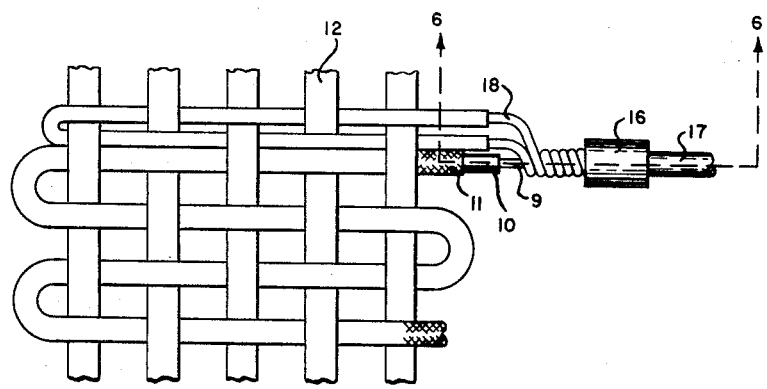
Fig. 5 is a view similar to Fig. 1, but illustrating a further modification.
Figure 6:
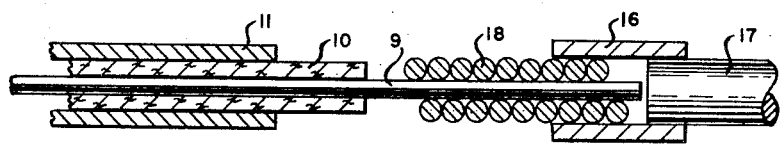
Fig. 6 is an enlarged sectional view taken on line 6—6 of Fig. 5.

For greater strength at the terminal or point of cold lead contact, and in accordance with the form shown in Figs. 5 and 6, the terminal-supporting wire 18, which is electrically insulated from the metallic strips 12, may have a portion thereof stripped and twisted around the current-conducting core of the heater wire 9 at the terminal portion of the last-mentioned wire. The stripped portion of the wire 18 may be secured to a current-conducting sleeve 16, as by soldering or the like, which, in turn, is connected to a cold lead 17, that is, the terminal of a current-supplying wire which has a much lower electrical resistance than the wire 9. In the form shown in Figs. 5 and 6, the looped wire 18 provides a very strong and effective resistance to strain and vibration in the terminal portion of the heater wire.

It will be noted that in all forms the heater wire may have an outer cover 11 of a metallic material. The heater wire is provided with an inner cover 10 of insulating material interposed between the conductor and the outer cover 11. Should this be found desirable, care must be exercised in the construction of the form of Figs. 5 and 6 to make all electrical contacts to heater wire beyond the strip point to thereby avoid electrical contact with the metallic cover 11.

Figure 2:
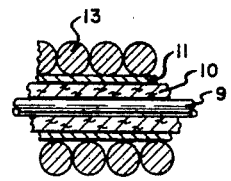
Fig. 2 is an enlarged sectional view taken on line 2—2 of Fig. 1.
Figure 3:
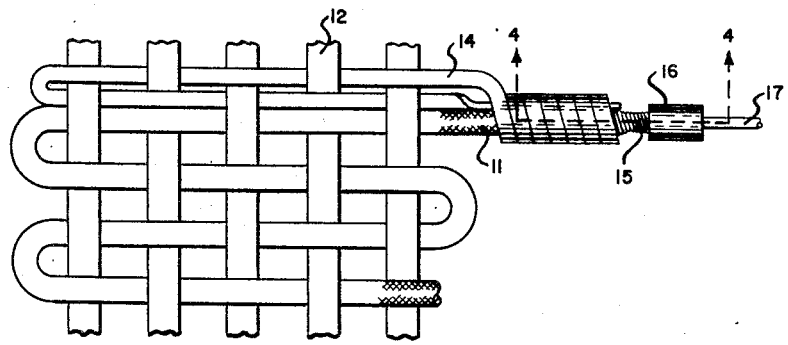
Fig. 3 is a view similar to Fig. 1, but illustrating a modified form of the heater element.
Figure 4:
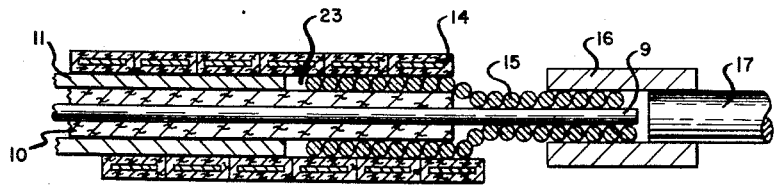
Fig. 4 is an enlarged sectional view taken on line 4—4 of Fig. 3.

When higher temperatures are encountered the form of Figs. 3 and 4 gives very satisfactory results. In the last-mentioned form there is provided an elongate terminal-supporting and strengthening member 14 which includes a flat metallic core provided with a cover of insulating material. A cover of braided glass fibers has been found to be a suitable insulating material. The member is locked in the weave of the net in a manner similar to the member 13, described in connection with the form of Figs. 1 and 2, and extends parallel to the insulated heater wire. The ends of the member 14 are wrapped tightly around the terminal portion of the heater wire.

This allows conduction of the heat generated in the current conducting member to be dissipated by the flat metallic strips 12 of the body of the net and builds up a mass outside the net over the current conducting member or members so that local heat in the lead area is more readily dissipated by convection and radiation. Note also that this method of construction provides mechanical strain relief to the current conducting member or members.

It is to be noted that whether the non-current-bearing extensions are insulated or uninsulated is a matter of convenience and design requirement. For example, in a structure where an overall outer coating of fired enamel is to be applied, it is much better to have all the exposed surfaces metallic and of the same metal.

When the terminal portion or portions of the heater wire have been protected in the manner described above, it is frequently necessary to electrically insulate and protect the cold lead 17 extending from the stripped end of the heater wire. In the aforementioned stripping of the terminal portion of the heater wire a portion of the inner or insulating cover 10 is left exposed. A cold lead extension 15 formed of uninsulated wire may be tightly wrapped directly over the last-mentioned portion of the cover 10 to extend beyond the latter directly over the bare conductor of the heater wire. However, the current-conducting wire 15 must terminate short of the metallic cover 11, as shown in Fig. 4. As shown in the last-mentioned view, the wrapped portion of the member 14 extends over that part of the wire 15 which is disposed directly over the cover 10. The wrapped portion of the member 14 and the cover 10 define a space 23 therebetween into which the wire 15 extends. It has been found that unless care is exercised at this point an undesirable reduction of electric strength will occur at elevated temperatures. However, the non-current-bearing member 14 is very effective in overcoming this danger. If the non-current-bearing member or members must be used uinsulated, insulated members may be clipped in position on the uninsulated members before the juncture of the cold extension and the procedure followed as above.

As an alternative (not shown) a solid metallic tube or braided metallic tubing may be slipped over the current conducting wire extension and pulled into the area of the net where it is locked in the weave, exposing sufficient length of current conducting wire to strip and attach cold leads and/or terminals. It is important to note that, if the circuit-bearing wire is to carry such an amperage as might destroy the electrical insulation strength or reduce it below allowable limits the principle of metal in close contact with the insulating material not be overlooked so that there exists no portion of the extended length of current-bearing wire which is not both electrically insulated and thermally protected and relieved by metallic members in close contact to the current-bearing members but electrically insulated therefrom.

Figure 7:
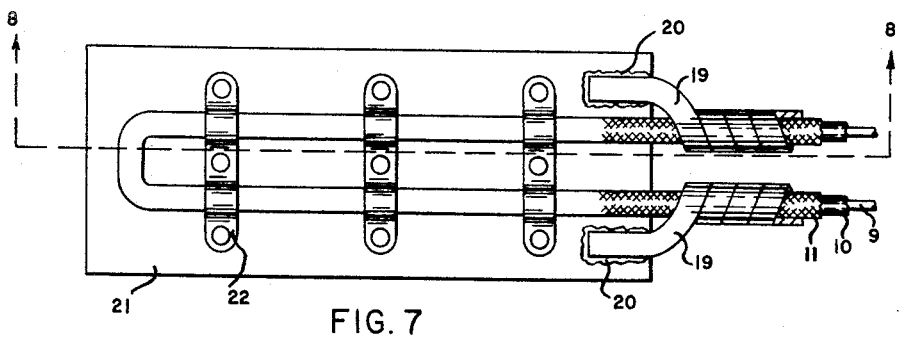
Fig. 7 is a top plan view illustrating still another form of the invention.
Figure 8:
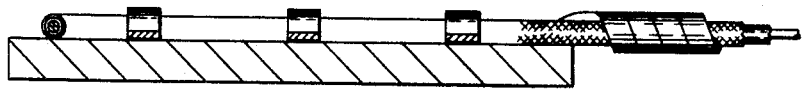
Fig. 8 is a sectional view taken on line 8—8 of Fig. 7.

In the form shown in Figs. 7 and 8, the heater wire, instead of giving off heat to a body comprising metal strips, gives off heat to a plate-like metal body 21. The heater wire is looped directly over the body 21 and secured to it by one or more brackets 22 fixed to the body by any conventional means. Each terminal portion of the heater wire is provided with an elongate terminal-supporting and -strengthening member 19 which, as shown in Fig. 7, may be formed of flat uninsulated wire, the member 19 having a portion thereof tightly wrapped about the terminal portion of the heater wire and having an end portion secured to the body 21 by welding, as at 20. The member 19 dissipates heat in the terminal portion of the heater wire in a manner similar to the member 14 described in connection with the form shown in Figs. 3 and 4.

Having thus described my invention I claim:

1. In an electrical heater element, a noncurrent-bearing metal body of substantial surface area to receive and dissipate heat, an insulated heater wire having a doubled portion thereof in intimate contact with the metal body to impart heat to the latter, the wire having a terminal portion extending beyond the body for electrical-current connection to a current-conducting supply wire having a lower electrical resistance than the heater wire, and an elongate member for supporting and strengthening said terminal portion and having a portion thereof of helical form intimately embracing a part of the terminal portion and having the turns thereof disposed in abutting relation to one another, said member also having a portion thereof diverging from the terminal portion and secured to the body for support by the latter, said member including a wire element.

2. In an electrical heater element as defined in claim 1, wherein the helical portion of the wire element is disposed directly over and in contact with the bare conductor of the heater wire at a part of the terminal poriton thereof, the body comprising a series of spaced metal strips, the heater wire having reverse loops formed therein to provide a series of approximately straight wire portions in laterally spaced-apart and substantially parallel relationship and woven through the metal strips for support by the latter, the portion of the supporting and strengthening member which is secured to the body being extended in parallel relation to said straight portions of the heater wire and being woven through a plurality of the metal strips, and the last-mentioned portion being insulated from the metal strips.

3. In an electrical heater element, a noncurrent-bearing metal body of substantial surface area to receive and dissipate heat, an insulated heater wire having a doubled portion thereof in intimate contact with the metal body to impart heat to the latter, the wire having a terminal portion extending beyond the body for electrical-current connection to a current-conducting supply wire having a lower electrical resistance than the heater wire, and an elongate member for supporting and strengthening said terminal portion and having a portion thereof of helical form intimately embracing a part of the terminal portion and having the turns thereof disposed in abutting relation to one another, said member also having a portion thereof diverging from the terminal portion and secured to the body for support by the latter, said member including a wire element which is noncurrent bearing, said member serving to dissipate heat from said terminal portion of the heater wire by conducting thermal energy from the last-mentioned portion to said metal body.

4. In an electrical heater element as defined in claim 3, wherein said wire element is of flattened cross section to provide a substantial surface area.

5. In an electrical heater element as defined in claim 3, wherein the wire element is enclosed in dielectric material.

6. In an electrical heater element as defined in claim 3, wherein said body comprises spaced parallel metal strips, the heater wire having reverse loops formed therein to provide a series of approximately straight wire portions in laterally spaced-apart and substantially parallel relationship and woven through the metal strips, and the portion of the supporting and heat-dissipating member which is secured to the body being extended parallel to said straight portions of the heater wire and being woven through a plurality of the metal strips.

7. In an electrical heater element as defined in claim 3, wherein said body comprises spaced parallel metal strips, the heater wire having reverse loops formed therein to provide a series of approximately straight wire portions in laterally spaced-apart and substantially parallel relationship and woven through the metal strips, and the portion of the supporting and heat-dissipating member which is secured to the body being extended parallel to said straight wire portions of the heater wire, the last-mentioned portion of the member being doubled on itself and looped over one of the metal strips for support by the latter, and the last-mentioned portion of the member also being woven through a plurality of the other metal strips.

8. In an electrical heater element as defined in claim 3, wherein the insulated heater wire has an outer metallic cover.

9. In an electrical heater element, an electrically insulated flexible heater wire having reverse loops formed therein to provide a series of approximately straight wire portions in laterally spaced-apart and substantially parallel relationship, the heater wire having an end forming a terminal portion for connection to a source of electric current, supporting means for the heater wire including a series of metal strips in parallel and spaced-apart relationship, the metal strips extending transversely of said straight wire portions and being woven therethrough, and a noncurrent-bearing wire for supporting and dissipating heat in said terminal portion of the heater wire, the supporting and heat-dissipating wire having a portion thereof of helical form intimately embracing a part of the terminal portion and having the turns thereof disposed closely adjacent one another, the supporting and heat-dissipating wire also having a portion thereof extending parallel to the straight wire portions of the heater wire and woven through a plurality of the metal strips, the supporting wire serving to dissipate heat from the terminal portion of the heater wire by conducting thermal energy from the latter to the last-named metal strips.

References Cited in the file of this patent

UNITED STATES PATENTS

| | | |
|---|---|---|
| 536,655 | Richards | Apr. 2, 1895 |
| 2,038,816 | Wetzel | Apr. 28, 1936 |
| 2,275,019 | Peterson | Mar. 3, 1942 |
| 2,455,720 | Young | Dec. 7, 1948 |
| 2,511,540 | Osterheld | June 13, 1950 |

FOREIGN PATENTS

| | | |
|---|---|---|
| 488,826 | Great Britain | July 14, 1938 |
| 625,218 | Great Britain | June 23, 1949 |